3,224,844
ZONE-MELTING METHOD FOR METAL COMPOUNDS
Peter Jakob Gerthsen, Aachen, Germany, assignor to North American Philips Company, Inc., New York, N.Y., a corporation of Delaware
Filed Feb. 28, 1962, Ser. No. 176,204
Claims priority, application Germany, Mar. 1, 1961, N 19,666
6 Claims. (Cl. 23—301)

The invention relates to a method of zone-melting a rod-shaped body consisting of a metal compound. The object of the invention is inter alia to effect the heating of a melted zone by means of an arc discharge. A method has already been proposed, in which for zone-melting a rod-shaped body an arc discharge was used between the rod and an electrode, the electrode consisting of a refractory substance, for example graphite or tungsten. However, such electrodes may give off impurities to the material of the rod. In addition, the arc produced by the discharge tended to displace, as a result of which the length of the melted zone varied irregularly.

According to a known variation of the above method, the electrode consists of the same material as the rod. Many materials exist which are suitable for treatment by zone-melting which cannot be used as electrodes for arc discharges, for example, materials which, at least in the very pure condition, have too low a specific conductivity for this purpose. For example, this is mostly the case with metal compounds and the invention further relates to the use of an electrode which is sufficiently conductive and which does not contaminate the material of the rod.

According to the invention, a molten zone in the rod is heated by an arc discharge with the use of at least one electrode consisting of at least one electrically conductive component, for example a metal component, of the compound, and the atmosphere in which the arc discharge takes place contains another component of the metal compound. If the compound contains several metal components, the electrode may consist, for example, of an alloy of these metal components. The other component may be present in the atmosphere, for example in an elementary form or in the form of a gaseous compound. At the heated regions, the metal of the electrode may react with the component in the atmosphere, in which a compound equal to the compound to be treated may be formed which, at the high temperatures produced there, is sufficiently conductive to maintain a current passage, while in the cold places of the electrode, the metal itself is present for current conduction. Since then the parts of the electrode adjacent the arc consist of the same material as the rod, the electrode as such will not influence the composition of the metal compound of the rod to be manufactured. It has appeared in addition that, when the metal compound formed on the electrode is melted by the arc discharge, the arc is not displaced over the formed surface of the melt.

Preferably, at least two of these electrodes are used on different sides of the rod. In this case, no current passage need be used through the solid portion of the rod and only the molten zone is used for current conduction.

The metal component need not have a higher melting point than the compound. Even in the case of a large difference of these melting points, the method according to the invention may be used. Preferably, the electrode consisting of the metal component is housed in a tube consisting of the metal compound, so that on heating the electrode by the arc discharge no melted metal flows away. The method is suitable, for example, for zone-melting rods consisting of metal oxides, in particular those which have a very high melting point. In this case, the atmosphere may contain gaseous oxygen. The method may also be used with metal compounds with easily volatilizing elements, such, for example, as arsenides and phosphides.

In order that the invention may readily be carried into effect, two embodiments thereof will now be described more fully with reference to the accompanying drawings, in which.

Figure 1:
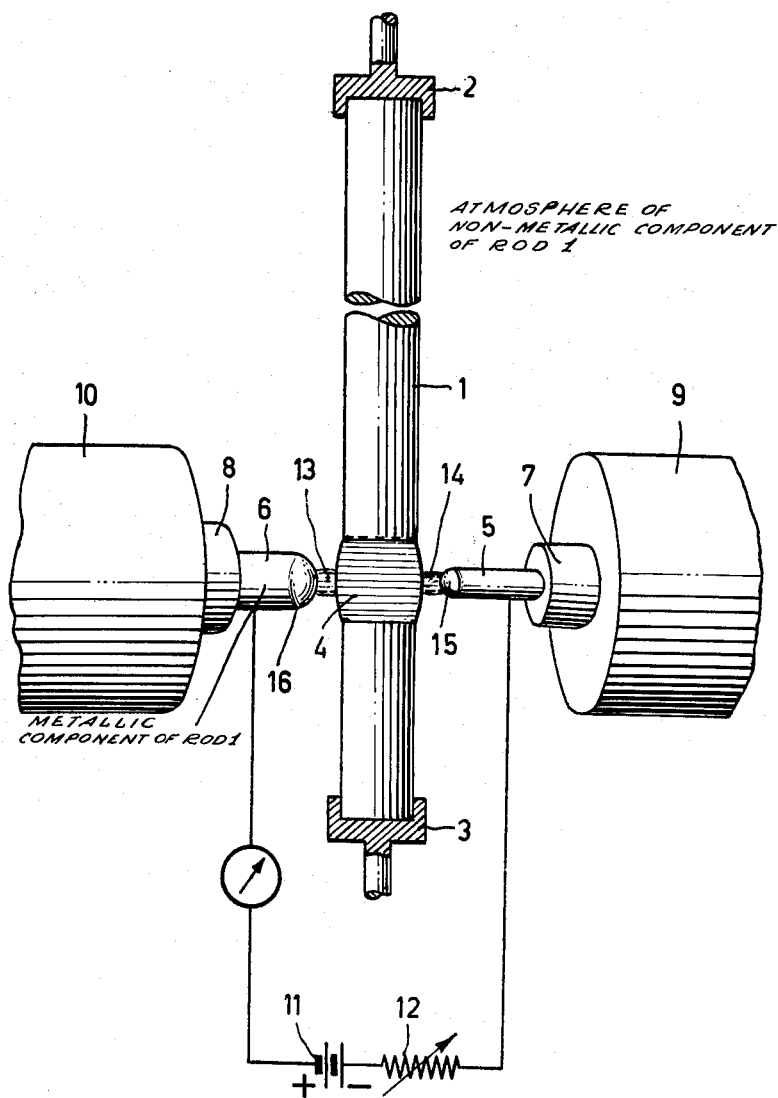
FIG. 1 is a front view of a part of a device for zone-melting a rod consisting of nickel oxide by means of an arc discharge.

In FIG. 1, a rod 1 consisting of sintered nickel oxide (NiO, melting point approximately 1950° C.) having a diameter of 4 mms. is clamped vertically between two holders 2 and 3. In the rod, a molten zone 4 is heated by an arc discharge. For that purpose, two rod-shaped electrodes 5 and 6 consisting of pure nickel are provided at the molten zone on sides opposite to one another, the ends of which electrodes are approximately 2 mms. remote from the zone 4. The electrode 5 has a diameter of 2 mms. and the electrode 6 a diameter of 4 mms. The electrodes 5 and 6 are housed in copper cooling tubes 7 and 8 respectively. The copper tubes are each surrounded by cooling jackets 9 and 10 respectively, through which cooling water is flowed. The connections for passing the cooling water are not shown. The rod 1 and the electrodes are surrounded by atmospheric air which is used as oxygen-containing gas.

The electrodes 5 and 6 are connected to the different terminals of a direct current source 11 of 200 v. with the interposition of a control resistor 12, the electrode 5 being connected as a cathode and the electrode 6 as an anode. Between the two electrodes, an electric current flows through the molten zone 4 and via two arcs 13 and 14 each between one of the electrodes 5 and 6 respectively and the molten zone 4. The current strength is maintained at approximately 3½ a. by means of the control resistor 12.

As a result of the heating by the arcs 13 and 14 respectively, the nickel at the rod-ends of the electrodes facing each other is oxidized in air and the nickel oxide formed is melted at the resulting high temperatures to form drops 15 and 16 respectively.

As electrons are emitted at the end of electrode 15 by which energy is consumed heating is less at said end than at the end of electrode 6 at which electrons are absorbed producing extra heat. However due to the larger diameter of electrode 6 cooling of this electrode is more effective than the cooling of electrode 5. Due to the high surface tension of molten nickel oxide and the strong adhesive forces between the drops 15 and 16 to the solid part of the rods 5 and 6 respectively, these drops do not fall off. Because the heated ends of the electrodes 5 and 6 consist of the same material as the molten zone, this zone is not contaminated by the electrodes. It was found that the arcs 13 and 14 do not tend to displace over the surfaces of the electrode ends, when these ends are molten. By a simultaneous vertical movement of the two electrodes, the molten zone will traverse the rod in its longitudinal direction in the manner commonly used in zone-melting.

Figure 2:
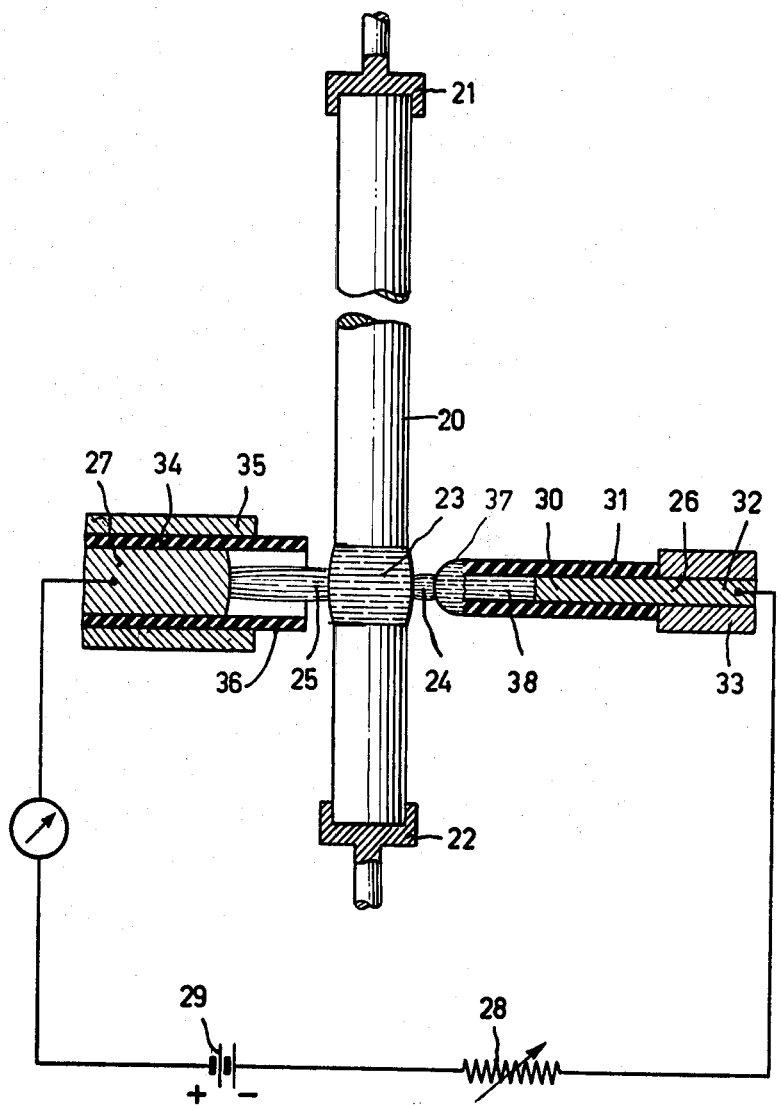
FIG. 2 shows partially in front view and partially in a vertical cross-section a part of a device for zone-melting a rod consisting of aluminum oxide by means of an arc discharge.

FIG. 2 shows a device for zone-melting aluminum oxide. A rod 20 consisting of aluminum oxide and having a diameter of approximately 6 mms. is clamped at right angles between an upper holder 21 and a lower holder 22. A molten zone 23 in the rod is heated by means of two arcs 24 and 25 each between one electrode 26 and 27 respectively and molten zone 23. Heating is carried out in atmospheric air, the air being used as oxygen-containing atmosphere.

The electrode 26 is rod-shaped and has a diameter of 2 mms. It consists of pure aluminum and is connected to the negative terminal of a direct current source 29 of 200 v. with the interposition of a control resistor 28. The part of the electrode 26 facing the molten zone is housed in a tube 31 consisting of aluminum oxide which has an inside diameter of 2 mms. and a wall thickness of 1 mm. Around the adjacent part 32 of the electrode 26, a cooled copper tube 33 is provided. At the end of the electrode 26 facing the molten zone, the aluminum heated by the arc 24 is oxidized in air and a molten drop 37 is formed consisting of aluminum oxide which forms a satisfactory conductive connection between the aluminum of the electrode 26 and the arc 24.

Due to the high surface tension of molten aluminum-oxide and its strong adhesion to the tube 31 the drop 37 does not fall off. The aluminum of the electrode is partially melted owing to its low melting point of approximately 650° C., but the melted aluminum 38 is prevented from flowing away by the tube 31 and the aluminum oxide drop 37.

The electrode 27 is rod-shaped and has a diameter of 5 mms. It consists of pure aluminum and is connected to the positive terminal of the current source 29. It is housed in a tube 34 consisting of aluminum oxide having an inside diameter of 5 mms. and a wall thickness of 1 mm. On the side facing the rod 20, the electrode 27 ends within the tube 34. The aluminum oxide tube 34 is surrounded by a cooled copper tube 35 substantially as far as its end. An end portion 36 of the tube 34 partially encloses the arc 25 and serves as a concentrator of this arc. As a result of the intensive cooling of the electrode 27 up to its end where the arc 25 is present, the aluminum is only slightly oxidized and even is not melted at all or hardly melted.

As already mentioned in the case of zone-melting nickel oxide cooling should be most effective at the positively charged electrode. It is obvious that a more efficient cooling of the end of electrode 27 in comparison with the cooling of the end of electrode 26 will occur.

The length of the arc 25 is adjusted at approximately 8 mms. and the length of the arc 24 at approximately 2 mms. The control resistor 28 is adjusted so that the current strength is approximately 4a. With such a current strength, a sufficient heating of the molten zone 23 is obtained.

By a simultaneous vertical movement of the two electrodes, the molten zone will traverse the rod in its longitudinal direction in a manner which is normal in zone-melting.

In the above examples the arc discharges may be started by contacting the electrode tips, moving the electrodes gradually away from each other in which one arc is formed and moving the rod gradually inbetween, such as described in the concurrently-filed copending application Ser. No. 176,205.

The method of the invention is especially important for the floating zone-melting of crystalline, non-conducting material for which the single electrode method previously suggested is unsuitable. In the floating-zone technique, the rod or ingot to be treated is held vertically, and a transverse molten zone is established in the body, which zone is maintained by surface tension forces, and then the zone caused to traverse the length of the body from one end to the other. In this way, undesired elements can be segregated and removed from the crystalline rod as in zone-refining, or certain desired elements may be uniformly distributed throughout the crystalline rod as in zone-levelling, or, with a seed crystal at one end, a single crystal can be grown from the polycrystalline rod as in zone-growing. Zone-growing single crystals in accordance with the invention is especially important for high-melting-point, non-conducting oxides, having a melting point above 1800° C. Aluminum oxide crystals made by the method of the invention can be used in piezo-electric transducers, and, suitably doped to form sapphires, in lasers. An especially significant advantage of the invention is the low power consumption in carrying out the process.

What is claimed is:

1. A method of zone-melting a body of a metal compound having poor electrical conductivity, said compound having a metal element which is electrically conductive, comprising providing a generally rod-shaped body of said metal compound, providing at least two solid electrodes each constiutued of at least one electrically-conductive metal adjacent the said body, the metal in the electrodes being the same as the electrically conductive metal element of the said compound in unreacted form, establishing an arc discharge between each of the said electrodes and a portion of the body to melt a transverse zone of the body in an atmosphere containing the other component of the metal compound, and causing relative movement of the electrodes and the rod-shaped body to pass the molten zone maintained by the arc discharge longitudinally through said body.

2. A method as set forth in claim 1 wherein the metal compound is a metal oxide, the electrodes are each constituted of the metal element of the metal oxide, and the atmosphere contains oxygen.

3. A method as set forth in claim 1 wherein at least one of the electrodes comprises a core of the metal element surrounded by a tubular body constituted of the metal compound.

4. A method of zone melting a body of a metal compound exhibiting high resistance, said compound having a metal element which is electrically conductive, comprising providing a generally rod-shaped body of said metal compound of given transverse dimensions, disposing opposite different peripheral portions of the said rod-shaped body at least two electrodes each having a cross-section smaller than the given transverse dimension of the body and each constituted of at least one electrically-conductive metal, the metal in the electrodes being the same as the electrically conductive metal element of said metal compound in unreacted form, establishing an arc discharge between each of the electrodes and opposed portions of the body to melt a transverse zone of the body causing the electric current of the arc discharges to flow through the molten zone contributing to the heating thereof and in an atmosphere containing the other component of the metal compound whereby a reaction occurs at least at one electrode tip forming the metal compound which melts due to the arc discharge but which is retained in molten form at the electrode tip, and causing relative movement of the electrodes and the rod-shaped body to pass the molten zone produced by the two arc discharges longitudinally through said body.

5. A method of treating by zone-melting a high-resistance when cold crystalline metal compound material whose conductivity increases sufficiently when molten to support an arc discharge said compound having an electrically conductive metal element, comprising providing a generally rod-shaped body of said material, disposing opposite different peripheral portions of the said rod-shaped body located generally in the same plane at least two spaced electrodes each constituted of at least one electrically conductive metal the same as the metal element of the said metal compound in unreacted form, applying an electric potential between the two electrodes to establish an arc discharge between each of the electrodes and opposed portions of the body in an atmosphere containing a non-metallic component of the metal compound to melt a transverse zone of the body located between the two electrodes and increase sufficiently its electrical conductivity causing the electric current of the arc discharges to flow from one electrode through the molten zone contributing to the heating thereof and thence to the other electrode, and causing relative movement of the electrodes and the rod-shaped body to pass the molten zone produced by the two arc discharges longitudinally through said body.

6. A method as set forth in claim 5 wherein the metal compound is a non-conducting oxide having a melting point above 1800° C.

References Cited by the Examiner

UNITED STATES PATENTS

| | | | |
|---|---|---|---|
| 690,856 | 1/1902 | Hanks | 219—121 |
| 740,379 | 9/1903 | Voelker | 219—121 XR |
| 2,428,825 | 10/1947 | Arnoldy | 148—145 XR |
| 2,739,088 | 3/1956 | Pfann | 148—1.5 |
| 2,999,737 | 9/1961 | Siebertz | 23—223.5 |

FOREIGN PATENTS 774,270   5/1957   Great Britain.

OTHER REFERENCES

Pfann: Zone Melting, 1958, John Wiley & Sons, Inc., Chapman & Hall, Ltd. Pages 89 to 93, Pfann (A); p. 77, Pfann (B).

NORMAN YUDKOFF, *Primary Examiner.*

ANTHONY SCIAMANNA, *Examiner.*